United States Patent Office 2,939,871
Patented June 7, 1960

2,939,871

2-CHLORO-SUBSTITUTED TETRAHYDROTHIOPHENE OXIDES, AND COMPOSITION CONTAINING THE SAME

William J. Pyne and Irving Rosen, Painesville, and Henry Bluestone, Cleveland Heights, Ohio, assignors to Diamond Alkali Company, Cleveland, Ohio, a corporation of Delaware No Drawing. Filed Sept. 18, 1956, Ser. No. 610,655

1 Claim. (Cl. 260—332.5)

This invention relates to novel polyhalotetrahydrothiophene-1-oxides containing at least one chlorine substituent in the 2-position.

More particularly, the present invention relates to novel polyhalotetrahydrothiophene-1-oxides having a structure within the following generic formula:

wherein X is a halogen, the term "halogen" being used to include fluorine, chlorine, bromine, and iodine, although chlorine is preferred, $m$ is a number from 1 to 7, inclusive, $n$ is a number from 1 to 2, inclusive, R is an alkyl group such as methyl, ethyl, and the like, and $a$ is a number from 0 to 4, inclusive.

Generally, compounds of the above structure exhibit a marked degree of biological activity and are useful in a variety of applications such as herbicides, insecticides, nematocides, and especially as seed protectants and soil fungicides, as will be described in more detail hereinafter. Presently preferred compounds of the present invention are those in which $a$ is 0.

Illustrative specific compounds of the above type are the following:

2,3,4,x-tetrachlorotetrahydrothiophene-1,1-dioxide
2,3,4,5-tetrachlorotetrahydrothiophene-1-monoxide
2,3,3,4,4-pentachlorotetrahydrothiophene-1,1-dioxide
2,3,4-trichlorotetrahydrothiophene-1,1-dioxide
2,3-dichlorotetrahydrothiophene-1,1-dioxide Dioxide compounds of this invention can be prepared by chlorinating a dihydrothiophene-1,1-dioxide or halogenated derivative thereof, e.g., 3-chloro-2,3-dihydrothiophene-1,1-dioxide. The monoxide compounds of this invention can be prepared by oxidation of a halogenated tetrahydrothiophene, as will be disclosed more fully hereinafter.

More specifically, monoxide compounds of this invention, i.e., having the structure

wherein X is a halogen, and $m$ is a number from 1 to 7, inclusive, preferably 1 to 4, can be produced by oxidizing a compound of the structure

wherein X is a halogen, and $m$ is a number from 1 to 7, is inclusive.

Dioxide compounds embodying the invention, i.e., having the structure

wherein X is a halogen, and $m$ is a number 1 to 7, inclusive, can be prepared by halogenating a compound of the structure

wherein X is a halogen, and $m$ is a number from 0 to 6, inclusive, preferably 1 to 4.

Compounds of this invention exhibit biological activity and may be employed in a variety of formulations, e.g., liquids and solids, including finely-divided powders and granular materials, as well as various liquid solutions, concentrates, emulsifiable concentrates, slurries and the like, depending upon the application intended and the formulation media employed.

It will be appreciated thus that compounds of this invention may be utilized in diverse biologically active compositions which contain as an essential active ingredient at least one novel compound of this invention, which composition may also contain various diluents, extenders, fillers, conditions, solvents and the like, e.g., clays, diatomaceous earth, pyrophyllite, talc, spent catalyst, alumina-silica materials, as well as such liquids as water and various organic liquids such as kerosene, benzene, acetone, toluene, xylene and other petroleum distillate fractions or mixtures thereof. When liquid formulations are employed or dry materials prepared which are to be used in liquid form, it frequently is desirable additionally to employ a wetting, dispersing or emulsifying agent to facilitate use of the formulation, e.g., Triton X-155 (alkyl aryl polyether alcohol), or Atlox G-3335 (alkyl aryl sulfonate blended with polyoxyethylene esters of fatty and resin acids).

In order that those skilled in the art may more completely understand the present invention and the preferred methods by which the same may be carried into effect, the following specific examples are offered:

EXAMPLE 1

Part a

PREPARATION OF 2,3,4,x-TETRACHLOROTETRAHYDROTHIOPHENE-1,1-DIOXIDE 32.5 gm. (0.20 mol) of 3-chloro-2,3-dihydrothiophene-1,1-dioxide is dissolved in a refluxing mixture of 1000 ml. of carbon tetrachloride and 300 ml. of chloroform and placed in a 2-liter, 3-necked, round-bottom flask equipped with a stirrer, condenser and gas inlet tube.

The solution is brought to reflux, agitation is started and while the solution is irradiated with a sun lamp (General Electric Company Model R-5), 432 gm. (6.1 mols) of chlorine gas is passed into the solution over a period of 4 hours. The thus-treated solution is allowed to cool.

The solvent is removed from the reaction mixture under reduced pressure yielding a colorless oil. This material is then dissolved in 180 ml. of 75% ethanol. On cooling, an oil comes out of the solution and partially crystallizes on standing. This material is filtered and the filter cake recrystallized from a mixture of 100 ml. of cyclohexane and 15 ml. of benzene and again filtered to yield a white solid melting at 113.5°–114.5° C.

Chemical analysis of this product indicates formation of the desired $C_4H_4Cl_4O_2S$ and is as follows, the quantities expressed being in terms of percent by weight.

| Element | Actual | Calculated |
| --- | --- | --- |
| C | 18.6 | 18.62 |
| H | 1.57 | 1.56 |
| Cl | 54.7 | 54.94 |

In the following references to test formulations, aqueous formulations of the indicated concentrations are intended unless otherwise indicated; these formulations are prepared by mixing the toxicant in water, usually employing a solvent, e.g., 5% acetone and an emulsifier, e.g., Triton X–155 (alkyl aryl polyether alcohol).

*Part b*

The product of Part *a* is evaluated as a toxicant against the bean beetle, roach, spider mite and bean aphid as follows:

(*a*) German cockroaches (*Blatella germanica*) 8 to 9 weeks old are anaesthetized with carbon dioxide to facilitate handling and are dipped into a test formulation of the product of Part *a* (2000 p.p.m.) for 10 seconds, removed, freed of excess liquid and caged. Two lots of 10 insects each are so treated. Mortality observations after 3 days indicate 100% mortality.

(*b*) With respect to the bean beetle, fourth instar larvae of the Mexican bean beetle (*Epilachna varivestis*) less than 1 day old within the instar are employed. Paired seed leaves excised from Tendergreen bean plants are dipped into test formulation of the product of Part *a* (2000 p.p.m.) until they are thoroughly wetted and then are allowed to dry. Each leaf is placed in a 9 cm. Petri dish with a filter paper liner and 10 randomly selected larvae are introduced. After 3 days' exposure, 100% mortality of the larvae is observed.

(*c*) The bean aphid (*Aphis fabae*) is cultured on nasturtium plants, test pots being prepared by reducing the number of plants in 2½ inch culture pots until those remaining are infested with approximately 100 aphids. After spraying the infested test plants with a test formulation of the product of Part *a* (2000 p.p.m.), mortality counts are made after 24 hours' exposure. A 65% mortality is observed.

(*d*) The miticide evaluation is made using the spider mite (*Tetranychus bimaculatus*) maintained on Tendergreen beans whereby a formulation (2000 p.p.m.) of the product of Part *a* is sprayed onto the infested test plants. Mortality determination made after 2 days indicates a 91% kill.

*Part c*

To demonstrate fungicidal effectiveness of compounds of this invention, slide germination tests are conducted using the product of Part *a* via the procedure recommended by the American Phytopathological Society and comprises using formulations containing the product of Part *a* in concentrations (prior to dilution of four volumes with one volume of spore stimulant and spore suspension) of 1000, 100, 10 and 1 parts per million, respectively, in tests wherein organisms are contacted therewith to inhibit spore germination. More specifically, spores from 7 to 10 day old cultures of *Alternaria oleracea* and *Monolinia fructicola* are contacted with the test fungicide and germination records are taken after 20 hours of incubation at 22° C. by counting 100 spores.

As a result of this test, it is observed that the product of Part *a* has an ED 50 value, i.e., the concentration which inhibits germination of one-half the spores in the test drops, of 0.1 to 1.0 part per million or less, which is better than the corresponding ED 50 value of 1 to 10 parts per million exhibited by copper sulfate employed as a standard reference material.

*Part d*

To demonstrate the effectiveness of compounds of this invention in protecting tomato plant foliage against early blight caused by the fungus *Alternaria solani*, duplicate tomato plants 5 to 7 inches high of the variety Bonny Best are each sprayed with 100 ml. of the product of Part *a* at a concentration of 400 parts per million. The sprayed plants, and comparable untreated control plants sprayed with the same formulation omitting the toxicant, are then sprayed with a spore suspension containing approximately 20,000 conidia of *Alternaria solani* per millimeter. The plants are held at 100% relative humidity for 24 hours at 70° F. and then removed to a greenhouse. After 2–4 days, lesion counts are made on the 3 uppermost fully expanded leaves and the data obtained thereby are converted to percentage disease control based on the number of lesions observed on the control plants.

At the lower concentration of 400 parts per million, 73% disease control is observed.

*Part e*

Tests are conducted to demonstrate herbicidal activity of compounds of this invention, both via direct contact, e.g., by spraying foliage, and by systemic action as indicated by soil watering tests. In the foliage spray tests, (1) tomato plants of the variety Bonny Best, 5 to 7 inches tall; (2) corn of the variety Cornell M–1 (field corn 4 to 6 inches tall); (3) beans of the variety Tendergreen; and (4) oats of the variety Clinton, are sprayed with 100 ml. portions of a test formulation of the product of Part *a* at a concentration of 6400 parts per million. After the sprayed plants are dry, they are removed to a greenhouse where they are observed 14 days after treatment.

Phytotoxicity is rated on a scale from 0–11, 11 indicating complete kill. As a result of the test on tomato, bean, corn and oats, respectively, values of 11, 11, 4 and 3 are observed.

In soil watering tests conducted to detect root absorption and translocation, tomato and bean plants, of about the same size and variety as used in the spray test, are treated by pouring 51 ml. of a 2000 parts per million test formulation of the product of Part *a* into 4 inch pots of soil containing the plants (corresponding to 128 lbs. per acre). At the concentration used, it is observed that both the tomato and bean plants are killed.

*Part f*

To demonstrate the ability of compounds of this invention to inhibit seed germination, tests are conducted using perennial rye grass and radish seeds. These seeds are treated in Petri dishes using aqueous suspensions of the product of Part *a* at concentrations of 1000 and 100 parts per million. Lots of 25 seeds of each type are scattered in separate dishes containing filter paper discs moistened with 5 ml. of the test formulation. After 7 to 10 days, the compounds are rated on their ability to inhibit germination of the seeds in a manner similar to that used in the slide germination test. Results of this test indicates that ED 50 values in the range of 10–100 parts per million are thus obtained with respect to each type of seed, demonstrating a high degree of seed germination inhibition.

*Part g*

To indicate the nematocidal effectiveness of the product of Part *a*, further tests are conducted to illustrate the effectiveness of the product of Part *a* as a contact poison against nematodes using the species *Panagrellus redivivus*. In this procedure, the nematodes are exposed to the product of Part *a* while in small watch glasses (27 mm. in diameter x 8 mm. deep) disposed within a 9 cm. Petri dish. The product of Part *a* is employed in an aqueous solution at a concentration of 1000 parts per million. As a result of this procedure, it is observed that after 24 hours there is achieved a 100% mortality via contact action and 80% mortality via fumigant action. This general procedure is repeated at concentrations of 500, 250 and 125 parts per million with the contact mortality percentage mortality values of 100, 100 and 93, respectively.

*Part h*

In a soil fungicide test, the product of part *a* is employed to kill seed decay and damping off fungi when mixed with soil, using peas as the indicator plant. The mean percentage stand after 14 days at various dosages of active ingredient are as follows:

| Equivalent lbs./acre: | Percentage stand |
|---|---|
| 64 | 98 |
| 32 | 100 |
| 16 | 94 |
| 12 | 97 |
| 4 | 93 |

For comparison with this data, an untreated control has a mean percentage stand of only 3% while a sterilized soil control sample has a percentage stand of 97%.

*Part i*

Further tests are carried out to determine the effectiveness of the product of Part *a* in protecting cucumber seeds from seed decay and damping-off fungi. Using the procedure of Part *i* of this example, the mean percentage stand at various dosages of active ingredient, expressed as percent of seed weight, are as follows:

| Dosage, percent: | Percent stand |
|---|---|
| 0.05 | 91 |
| 0.025 | 90 |
| 0.0125 | 89 |

Compared with this data, an untreated control has a mean percentage stand of only 20, while a sterilized soil control mean has a percentage stand of 83.

EXAMPLE 2

*Part a*

PREPARATION OF 2,3,4,5-TETRACHLOROTETRAHYDRO-THIOPHENE-1-MONOXIDE

Into a 1-liter, 3-necked, round-bottom flask equipped with an agitator, condenser, thermometer, and dropping funnel are introduced 55.3 gm. (0.24 mol) tetrachlorotetrahydrothiophene and 350 ml. glacial acetic acid. This mixture is heated to 70° C. and 135 gm. (1.2 moles) of 30% $H_2O_2$ is added dropwise. The solution is maintained at 70° C. for three hours after which the material is poured onto crushed ice. There results a thick, viscous oil which is separated and triturated with petroleum ether to effect crystallization. The resultant solid is recrystallized twice from a benzene-heptane mixture to obtain a solid (M.P. 86.5°–87.5° C.). Chemical analysis, indicates formation of the desired $C_4H_4Cl_4OS$ and is as follows:

| Element | Percent actual | Percent calculated |
|---|---|---|
| C | 20.13 | 19.85 |
| H | 1.80 | 1.62 |
| Cl | 58.2 | 58.6 |

*Part b*

To demonstrate the insecticidal activity of 2,3,4,5-tetrachlorotetrahydrothiophene-1-monoxide, 10 ml. of this material as an aqueous formulation, containing 10% of sugar, in a concentration of 2000 parts per million, is placed on a piece of cellucotton. Twenty-five houseflies, 45 days old, are caged over the thus-treated cellucotton and mortality counts are made after 24 hours. The results of such a test indicates that an 80% mortality is observed.

Further to demonstrate the insecticidal activity of 2,3,4,5-tetrachlorotetrahydrothiophene-1-monoxide, tests are conducted against fourth instar larvae of the yellow fever mosquito (*Aëdes aegypti*). In this procedure, the test formulation at a concentration of 20 parts per million is placed in contact with 25 larvae. After 48 hours, 100% mortality is observed.

*Part c*

Using the procedure of Example 1, Part *c*, slide germination tests are conducted using 2,3,4,5-tetrachlorotetrahydrothiophene-1-monoxide which exhibits an ED 50 value, i.e., the concentration that inhibits germination of half the spores in the test drops of equal to or less than 0.1 to 1.0 part per million.

*Part d*

Using the procedure of Example 1, Part *d* tests against tomato foliage to demonstrate the effectiveness of 2,3,4,5-tetrachlorotetrahydrothiophene-1-monoxide as a control for early blight fungus (*Alternaria solani*) are carried out at a concentration of 400 parts per million. 88% control is observed. Similar tests carried out against late blight (*Phytophthora infestans*) indicate, at a concentration of 400 parts per million, 99% disease control.

*Part e*

Using the procedure of Example 1, Part *e*, herbicidal tests are carried out via foliage spray utilizing 2,3,4,5-tetrachlorotetrahydrothiophene-1-monoxide at a concentration of 6000 parts per million on tomato and corn plants. In both instances, the plants are killed, thus indicating a high degree of herbicidal activity at the concentration employed. Soil watering tests are conducted at a concentration equivalent to 128 lbs. per acre on the same type of tomato and bean plants with the result that again the plants are killed at the concentration employed.

*Part f*

To illustrate pre-emergent herbicidal activity, tests are conducted using 2,3,4,5-tetrachlorotetrahydrothiophene-1-monoxide at a concentration of 64 lbs. per acre. The resultant estimated percentage stand as compared to check at this concentration is 0 for broadleaf, and 30 for grass, thus indicating a marked degree of herbicidal activity. Further tests of the same type at concentrations of 32 lbs. per acre indicate that the estimated percentage stands of broadleaf and grass are 20 and 75, respectively.

Using a 2,3,4,5-tetrachlorotetrahydrothiophene-1-monoxide as a post-emergent foliage spray at a concentration of 6400 parts per million against tomato, bean, and oats, it is observed that the tomato and bean plants are killed while the oats are severely damaged. In further soil watering tests at concentrations at 128 and 64 lbs. per acre against beans and tomatoes, it is observed that the plants are killed.

*Part g*

To illustrate effectiveness as a soil fungicide, 2,3,4,5-tetrachlorotetrahydrothiophene-1-monoxide is applied in a manner similar to that of Example 1, Part *i*. After 14 days, employing dosages equivalent to 128 and 64 lbs. per acre of active ingredients, using peas as the test plant and applying the formulation into the soil, there are observed percentage stands of 98 and 100, respectively. An untreated control means is 6 while a sterilized soil control mean has a value of 97, thus indicating a high degree of soil fungicide activity.

*Part h*

To illustrate nematocidal activity of 2,3,4,5-tetrachlorotetrahydrothiophene-1-monoxide tests are conducted against tomato plants grown in soil containing root knot nematodes (Meloidogyny sp.) by applying this material to composted greenhouse soil in ½ gallon glazed crocks, each infested with 3 to 5 grams of knotted or galled tomato roots. Treatment is at the rate of 512 lbs. per acre (770 mg. per crock) by mixing the chemical with the soil. A rating system of 0 for none to 5 for severe infestation indicates that a 0.0 rating is obtained using this procedure. An untreated check sample of the same material has a rating of 4.8, thus indicating a high degree of infestation.

*Part i*

To indicate effectiveness as bactericides, tests are conducted using 2,3,4,5 - tetrachlorotetrahydrothiophene - 1-monoxide at a concentration of 1000 parts per million against the bacteria *E. amylovora* and *X. phaseoli*. The growth ratings of the four organisms after a 4-hour exposure to the test formulation indicate that a rating of "A" is obtained against *E. amylovora* and *X. phaseoli*, respectively, in comparison with ratings of "D" against untreated check samples.

EXAMPLE 3
PREPARATION OF 2,3,4-TRICHLOROTETRAHYDRO-THIOPHENE-1,1-DIOXIDE

Into a 3-necked 500 milliliter, round-bottom flask equipped with a condenser and dropping funnel is introduced 60 gm. (0.4 mol) of 3-chloro-2,3-dihydrothiophene-1,1-dioxide. This material is melted and 70 gm. (0.5 mol) of $SO_2Cl_2$ is introduced through the dropping funnel. A solution of 0.5 gm. benzoyl peroxide (0.002 mol) in carbon tetrachloride is added through the condenser. Agitation and heating are continued for about 2 hours at which time the excess chlorinating agent and gases are removed. The resulting material is distilled and the fraction boiling between 132° C. at 2.0 mm. and 134° C. at 2.2 mm. Hg is collected.

This material is subjected to chromatographic separation using a gel of 200 mesh silicic acid, chloroform and excess water. From the chromatographic separation is obtained a solid product melting at 58°-62° C. Chemical analysis of this substance reveals a chlorine content of 47.4% (theoretical for $C_4H_5Cl_3O_2S$ 47.6%) and infra red absorption spectrum indicates absence of a C—C double bond, thus indicating the preparation of the desired trichloro-compound.

EXAMPLE 4
PREPARATION OF 2,3-DICHLOROTETRAHYDROTHIO-PHENE-1,1-DIOXIDE

Into a 500 ml. 3-necked round-bottomed flask equipped with a water cooled condenser is introduced 4.0 gm. (0.034 mol) of α-butadiene sulfone (2,3-dihydrothiophene-1,1-dioxide). This material is melted and maintained at a temperature of about 70° C. by means of an oil bath. To the molten material is added 4.9 gm. (0.036 mol) of $SO_2Cl_2$ and 0.05 gm. benzoyl peroxide dissolved in several milliliters of carbon tetrachloride. This mixture is then refluxed for about two hours.

Heating is discontinued and the material allowed to cool and a vacuum applied to remove low boiling materials, with slight heating being used to facilitate removal. The resulting material is subjected to chromatographic separation by dissolving it in chloroform and passing it through a silicic acid (80-mesh)-chloroform column. From the chromatographic separation, crystals melting at 78°-83° C. are obtained. Chemical analysis of this product reveals a chlorine content of 36.7% (theoretical for $C_4H_6Cl_2O_2S$), thus indicating formation of the desired dichlorocompound.

EXAMPLE 5
PREPARATION OF 2,3,3,4,4-PENTACHLOROTETRA-HYDROTHIOPHENE-1-1-DIOXIDE 200 gm. (1.31 mol) of 3-chloro-2,3-dihydrothiophene-1,1-dioxide is dissolved in 400 ml. of chloroform. This material is added to a 3-necked, round-bottomed flask equipped with an agitator, gas inlet tube, heating mantle and mercury lamp (Hanovia No. 8A–1–100 watt). Introduction of chlorine is begun and over a period of 32 hours a total of 3,633 gm. of chlorine is passed into the solution. The reaction mixture is then evacuated and placed on a water bath (80° C.) to facilitate removal of the solvents. There results a nearly colorless oil which partially solidifies on cooling.

This partially solidified product is filtered to yield a white solid and an oil. The solid is dissolved in a hot mixture of 125 ml. of benzene and 1000 ml. of cyclohexane and allowed to crystallize slowly. The solids are removed by filtration and found to melt at 126.5°–128° C. A portion of this solid is dissolved in a hot mixture of 50 ml. of benzene and 400 ml. cyclohexane and again allowed to crystallize. A white crystalline solid separates which melts at 127°–128° C. Chemical analysis of this substance indicates the preparation of the desired $C_4H_3Cl_5O_2S$:

| Element | Percent actual | Percent theoretical |
|---|---|---|
| C | 16.73 | 16.43 |
| H | 1.08 | 1.03 |
| Cl | 60.4 | 60.6 |

EXAMPLE 6
PREPARATION OF 2,3,4,5-TETRACHLOROTETRAHYDRO-THIOPHENE-1-MONOXIDE

Into a 1-liter, round-bottomed flask equipped with an agitator, thermometer and a dropping funnel are introduced 65.7 gm. (0.286 mol) of alpha-tetrachlorotetrahydrothiophene, prepared in accordance with the method disclosed in U.S. Patent 2,525,773 wherein thiophene is chlorinated at a temperature of 50°–100° C. using gaseous chlorine, and 400 ml. of glacial acetic acid. The mixture is heated to 50° C. to effect solution. To this solution is added 35.2 gm. (0.31 mol) of 30% $H_2O_2$ dropwise. This mixture is then poured into 3 liters of ice and the solid precipitated is separated (M.P. 80°–84° C.). This material is dissolved in benzene, filtered hot and any traces of water present are removed by distillation. To the hot solution is added 250 ml. of n-heptane. Crystallization of this solution and recrystallization from a mixture of 100 ml. benzene and 200 ml. of heptane yields the desired $C_4H_4Cl_4OS$ (M.P. 86.5°–87.5° C.).

It is to be understood that although the invention has been described with specific reference to particular embodiments thereof, it is not so limited, since changes and alterations therein may be made which are within the full intended scope of this invention as defined by the appended claim.

What is claimed is:

The compound 2,3,4,5-tetrachlorotetrahydrothiophene-1-monoxide.

References Cited in the file of this patent

Zuydewijn: Recueil des Travaux Chimiques des Pays-Bas, vol. 57, pp. 445–455 (1938).
Backer et al.: Recueil des Travaux Chimiques des Pays-Bas, vol. 54, pp. 538–544 (1935).
Backer et al.: Recueil des Travaux des Chimiques des Pays-Bas, vol. 53, pp. 525 to 543 (1934).
Backer: Rec. trav. Chim., vol. 59, pp. 1141–55 (1940).
Jordan: JACS, vol. 71, pp. 1875–6 (1949).
Marvel: JACS, vol. 61, pp. 2714–6 (1939).
Wagner and Zook: Syn. Org. Chem. (1953), p. 801.

UNITED STATES PATENT OFFICE

CERTIFICATE OF CORRECTION

Patent No. 2,939,871 June 7, 1960

William J. Pyne et al.

It is hereby certified that error appears in the printed specification of the above numbered patent requiring correction and that the said Letters Patent should read as corrected below.

Column 1, line 72, strike out "is"; column 2, line 9, after "number" insert -- from --; column 5, line 30, for "Part i" read -- Part h --.

Signed and sealed this 20th day of December 1960.

(SEAL)
Attest:

KARL H. AXLINE
Attesting Officer

ROBERT C. WATSON
Commissioner of Patents